United States Patent
Jeon

(10) Patent No.: US 10,836,431 B1
(45) Date of Patent: Nov. 17, 2020

(54) VEHICLE CONTROL APPARATUS AND VEHICLE CONTROL METHOD

(71) Applicant: MANDO CORPORATION, Pyeongtaek-si (KR)

(72) Inventor: Kyung Geun Jeon, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 16/781,602

(22) Filed: Feb. 4, 2020

(30) Foreign Application Priority Data

Sep. 9, 2019 (KR) .................. 10-2019-0111336

(51) Int. Cl.
| | |
|---|---|
| *B60W 10/20* | (2006.01) |
| *B62D 15/02* | (2006.01) |
| *B62D 5/04* | (2006.01) |
| *B62D 6/08* | (2006.01) |
| *B60R 21/00* | (2006.01) |

(52) U.S. Cl.
CPC ....... *B62D 15/0265* (2013.01); *B62D 5/0463* (2013.01); *B62D 6/08* (2013.01)

(58) Field of Classification Search
CPC .............. B60W 10/20; B60W 10/22; B60R 2021/0004; B60R 21/00; B60K 31/00
USPC ......................................................... 701/301
See application file for complete search history.

(56) References Cited

U.S. PATENT DOCUMENTS

| | | | | |
|---|---|---|---|---|
| 8,571,786 | B2* | 10/2013 | Iwasaki ................. | B60W 10/20 701/300 |
| 2012/0101701 | A1* | 4/2012 | Moshchuk ............ | B60W 30/09 701/70 |
| 2016/0264135 | A1* | 9/2016 | Yamakado .......... | B60W 30/045 |
| 2018/0162444 | A1* | 6/2018 | Park ..................... | B60W 10/119 |

FOREIGN PATENT DOCUMENTS

| | | |
|---|---|---|
| JP | H07-137590 A | 5/1995 |
| KR | 10-2018-0068737 A | 6/2018 |

* cited by examiner

*Primary Examiner* — Tan Q Nguyen
(74) *Attorney, Agent, or Firm* — Morgan, Lewis & Bockius LLP

(57) ABSTRACT

Disclosed herein is a vehicle control apparatus and a vehicle control method. The vehicle control apparatus includes a first sensor configured to detect an object; a second sensor configured to detect driver steering input information; an Autonomous Emergency Steering Assist (AESA) device configured to perform automatic emergency steering assist; a Driver-initiated Emergency Steering Assist (DESA) device configured to perform emergency steering assistance based on the driver steering input information; and a controller configured to control the AESA device to apply a steering assist control torque value corresponding to the AESA device differently for each of collision risk levels in a collision risk situation with the detected object, and when there is the detected driver steering input information, to control the DESA device to apply a steering assist control torque value corresponding to the DESA device according to the driver steering input information.

27 Claims, 13 Drawing Sheets

[FIG. 1]
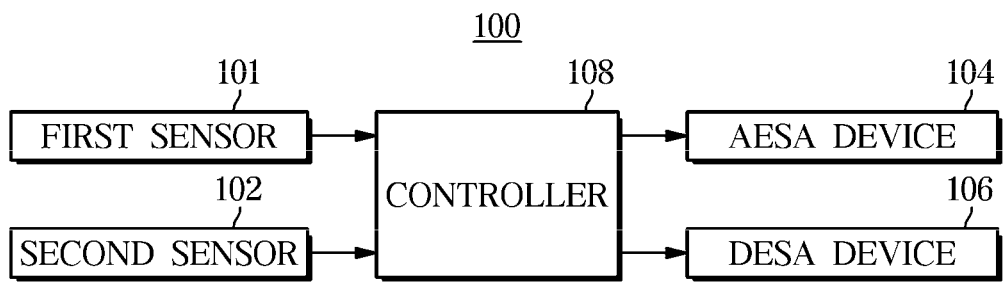

[FIG. 2]
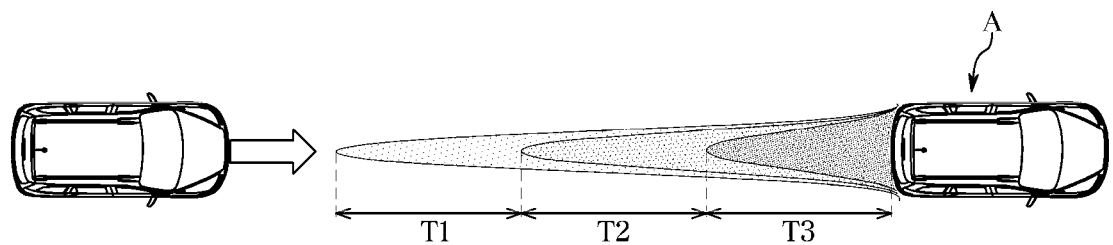

[FIG. 3]
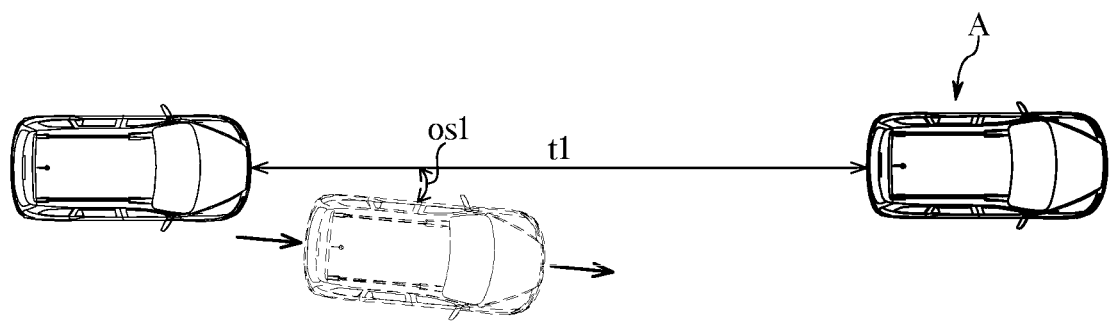

[FIG. 4]
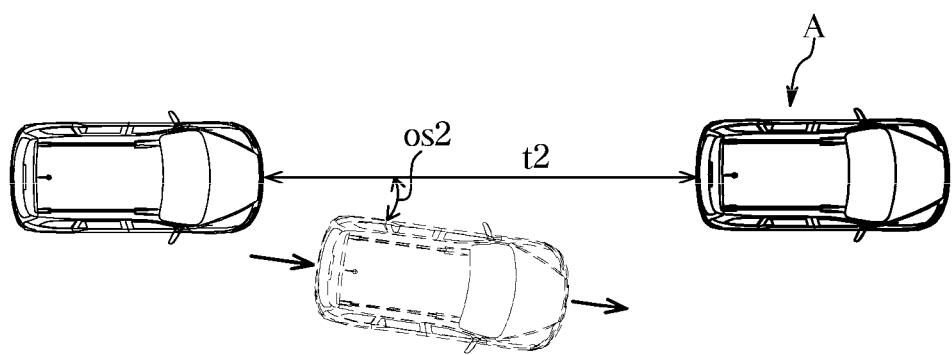

[FIG. 5]
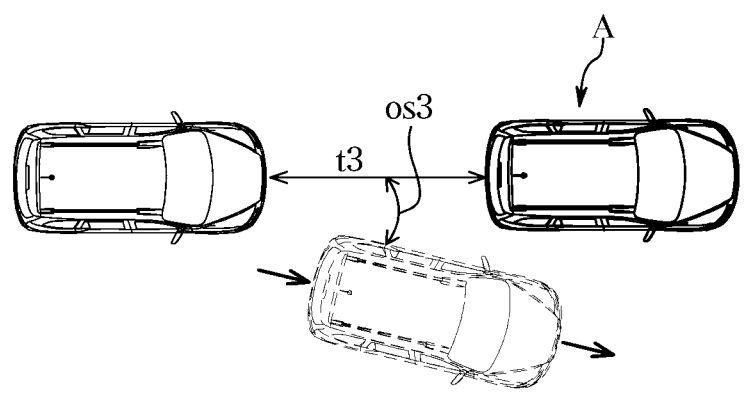

[FIG. 6]
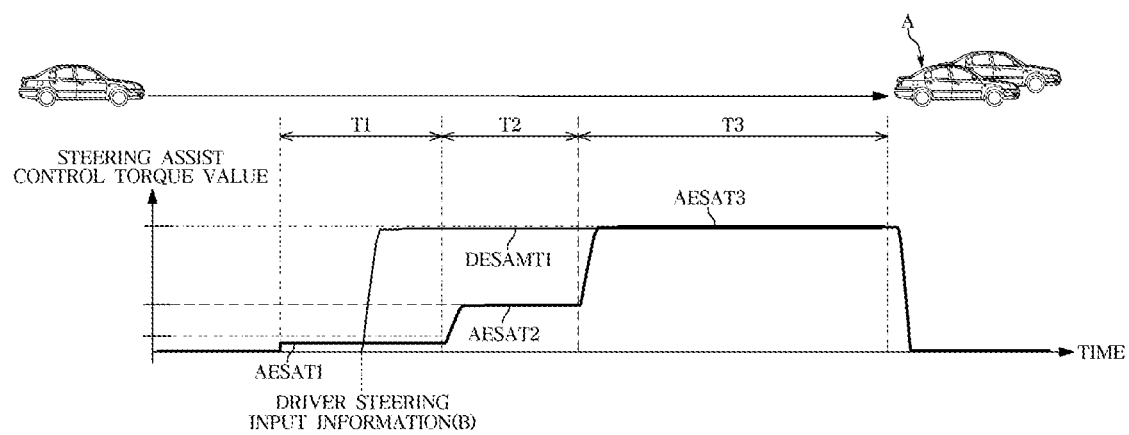

[FIG. 7]
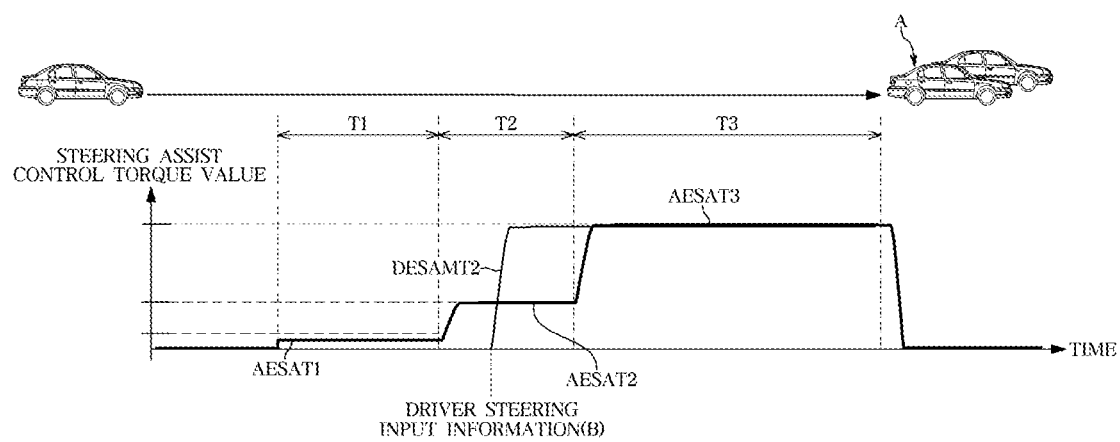

[FIG. 8]
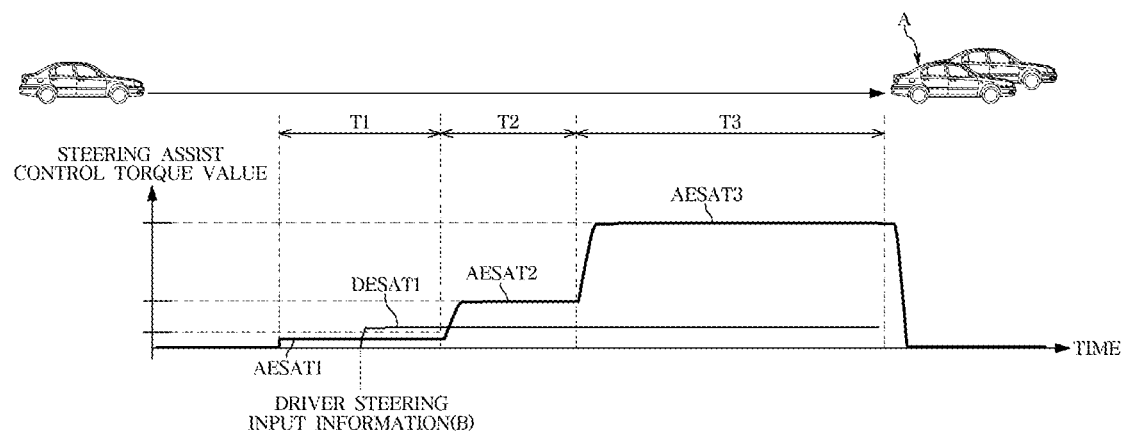

[FIG. 9]
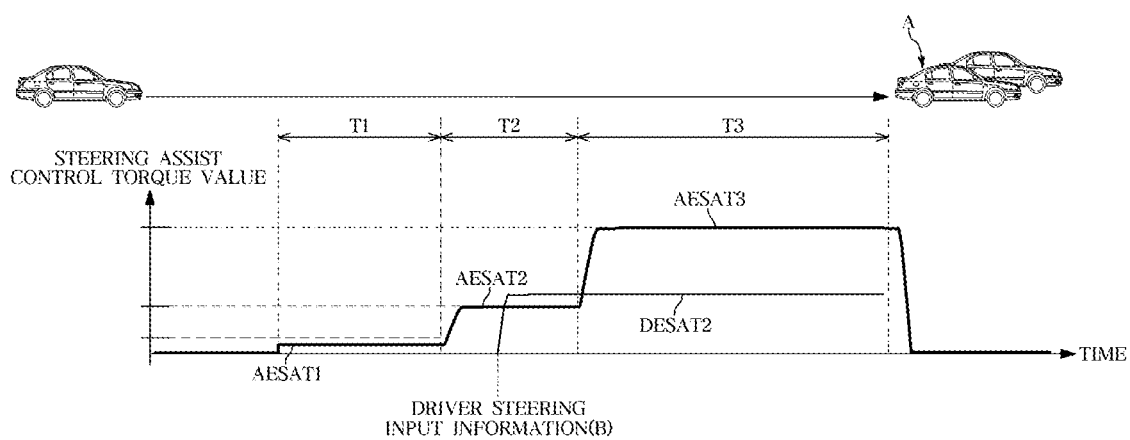

[FIG. 10]
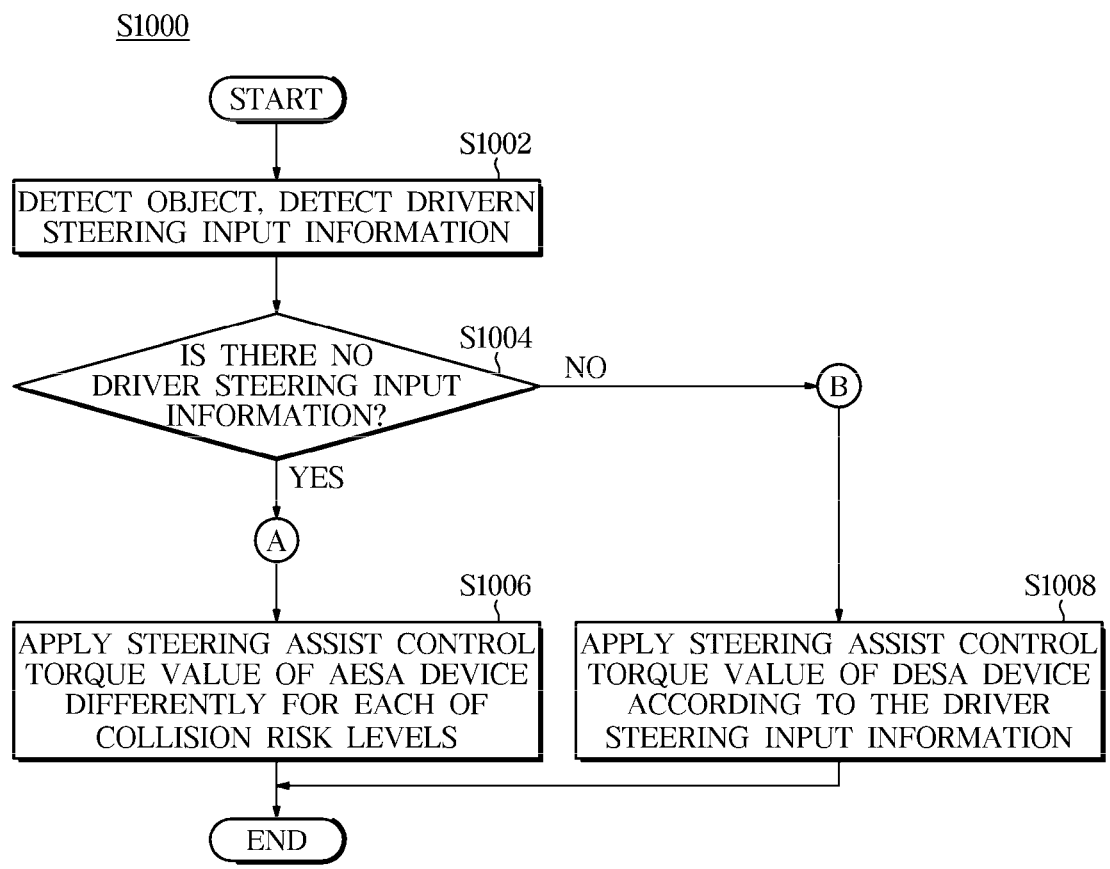

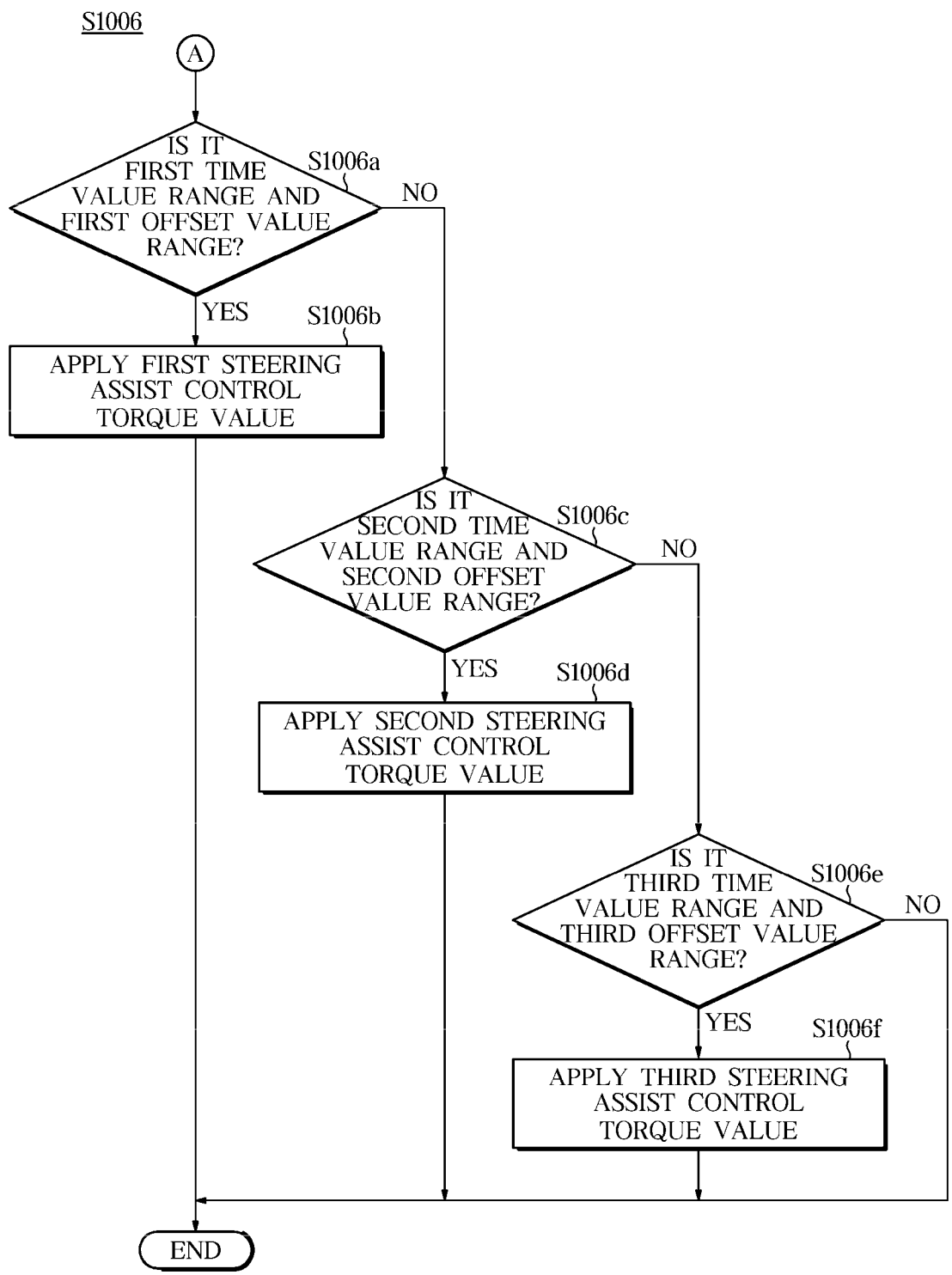

[FIG. 12]
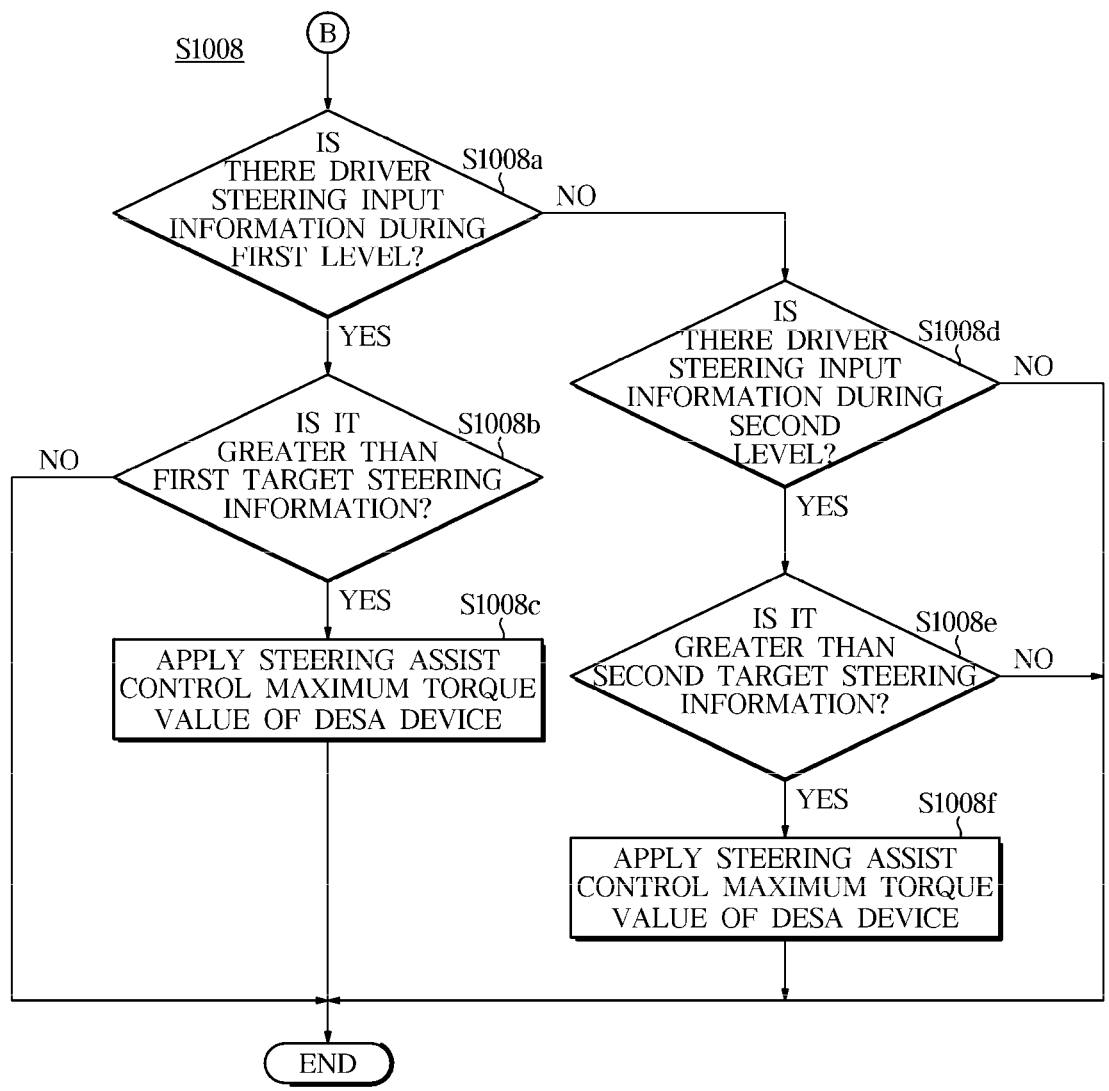

[FIG. 13]
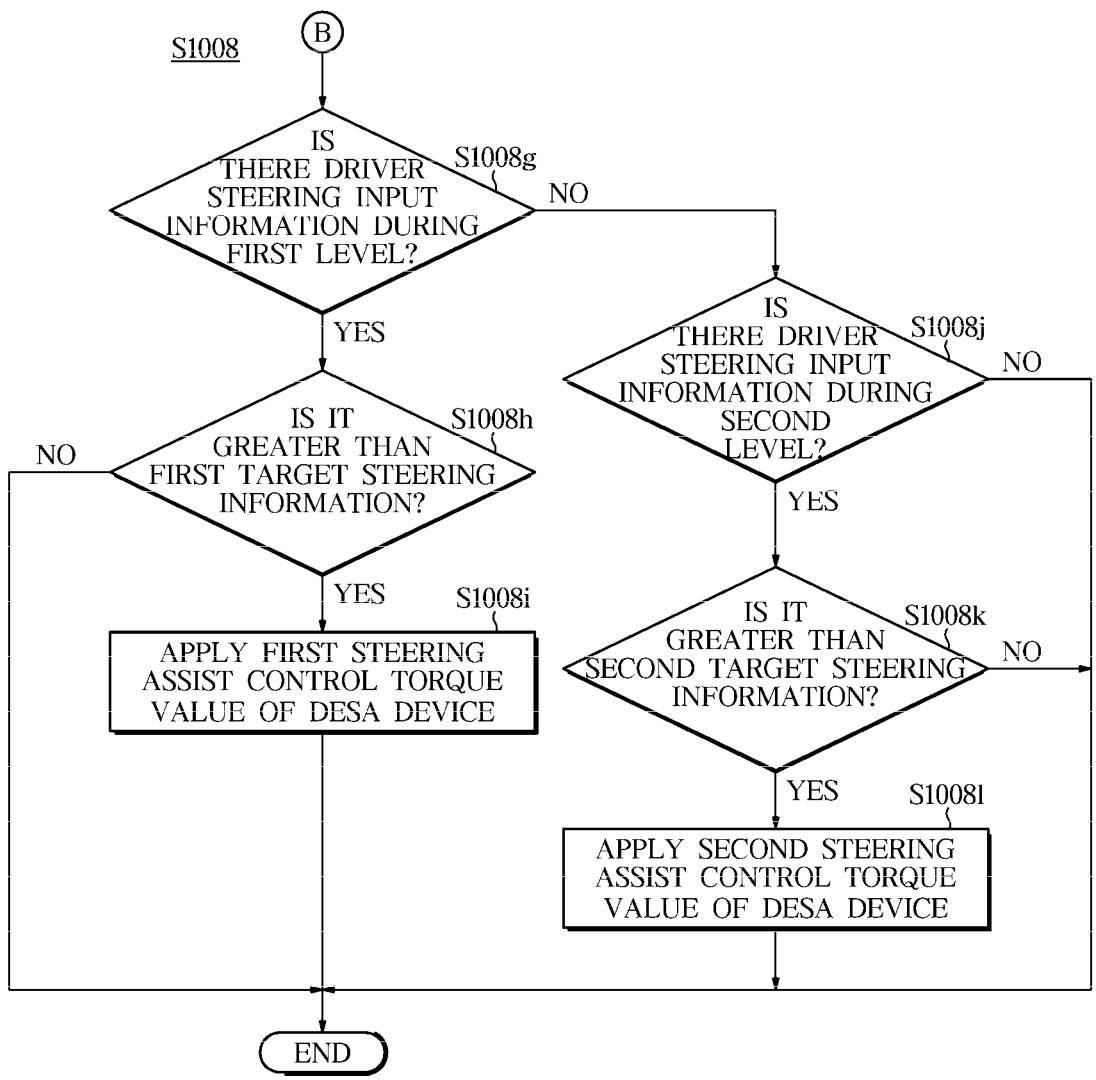

VEHICLE CONTROL APPARATUS AND VEHICLE CONTROL METHOD

CROSS-REFERENCE TO RELATED APPLICATION(S)

This application is based on and claims priority under 35 U.S.C. § 119 to Korean Patent Application No. 10-2019-0111336, filed on Sep. 9, 2019 in the Korean Intellectual Property Office, the disclosure of which is incorporated by reference in its entirety.

TECHNICAL FIELD

The disclosure relates to a vehicle control apparatus and a vehicle control method.

BACKGROUND

Generally, vehicles perform collision avoidance control when a risk of collision with an object occurs.

An example of a conventional technology is disclosed in Korean Patent Publication No. 10-1708135 (Feb. 13, 2017), relating to a collision avoidance support apparatus and a collision avoidance support method, in which suppress the release of a braking assist for collision avoidance is disclosed as a collision prediction time is shorter when performing collision avoidance control between the vehicle and the object.

However, a conventional collision avoidance support device and collision avoidance support method has a limitation in preventing a collision with the object in advance.

In addition, the conventional collision avoidance support apparatus and collision avoidance support method has a limitation in further maintaining a stable riding comfort in avoidance control.

SUMMARY

Therefore, it is an aspect of the disclosure to provide a vehicle control apparatus and a vehicle control method capable of further preventing a collision with an object.

It is another aspect of the disclosure to provide a vehicle control apparatus and a vehicle control method capable of further maintaining a stable riding comfort in avoidance control.

Additional aspects of the disclosure will be set forth in part in the description which follows and, in part, will be understood from the description, or may be learned by practice of the disclosure.

In accordance with an aspect of the disclosure, a vehicle control apparatus includes a first sensor configured to detect an object; a second sensor configured to detect driver steering input information; an Autonomous Emergency Steering Assist (AESA) device configured to perform automatic emergency steering assist; a Driver-initiated Emergency Steering Assist (DESA) device configured to perform emergency steering assistance based on the driver steering input information; and a controller configured to control the AESA device to apply a steering assist control torque value corresponding to the AESA device differently for each of collision risk levels in a collision risk situation with the detected object, and when there is the detected driver steering input information, to control the DESA device to apply a steering assist control torque value corresponding to the DESA device according to the driver steering input information.

When determining the collision risk situation with the detected object for each of the collision risk levels, the controller may be configured to determine a risk of collision using a longitudinal collision estimated time and a lateral offset with the detected object.

When the collision risk level is a first level in which the longitudinal collision estimated time is a set first time value range and the lateral offset is a set first offset value range, the controller may be configured to control the AESA device to apply a first steering assist control torque value of steering assist control torque values corresponding to the AESA device.

When the collision risk level is a second level in which the longitudinal collision estimated time is a second time value range shorter than a set first time value range, and the lateral offset is a second offset value range larger than a set first offset value range, the controller may be configured to control the AESA device to apply a second steering assist control torque value higher than a first steering assist control torque value of steering assist control torque values corresponding to the AESA device.

When the collision risk level is a third level in which the longitudinal collision estimated time is a third time value range shorter than a set second time value range, and the lateral offset is a third offset value range larger than a set second offset value range, the controller may be configured to control the AESA device to apply a third steering assist control torque value higher than a second steering assist control torque value of steering assist control torque values corresponding to the AESA device.

When there is the driver steering input information, the controller may be configured to control the DESA device to apply a steering assist control maximum torque value corresponding to the DESA device for each of the collision risk levels according to the driver steering input information, and to control the DESA device to apply steering assist control torque values corresponding to the DESA device differently for each of the collision risk levels according to the driver steering input information.

The controller may be configured to, when there is the driver steering input information during a first level of the collision risk levels, determine whether the driver steering input information is greater than a set first target steering information, and when the driver steering input information is greater than the first target steering information, to control the DESA device to apply the steering assist control maximum torque value corresponding to the DESA device.

The controller may be configured to, when there is the driver steering input information during a first level of the collision risk levels, determine whether the driver steering input information is greater than a second target steering information set smaller than the first target steering information, and when the driver steering input information is greater than the second target steering information, to control the DESA device to apply the steering assist control maximum torque value corresponding to the DESA device.

The controller may be configured to, when there is the driver steering input information during a first level of the collision risk levels, determine whether the driver steering input information is greater than a set first target steering information, and when the driver steering input information is greater than the first target steering information, to control the DESA device to apply a first steering assist control torque value of the steering assist control torque values corresponding to the DESA device.

The controller may be configured to, when there is the driver steering input information during a first level of the collision risk levels, determine whether the driver steering input information is greater than a second target steering information set smaller than the first target steering information, and when the driver steering input information is greater than the second target steering information, to control the DESA device to apply a second steering assist control torque value higher than the first steering assist control torque value of the steering assist control torque values corresponding to the DESA device.

In accordance with another aspect of the disclosure, a method of controlling a vehicle includes detecting, by a sensor, an object and driver steering input information; determining, by a controller, whether there is no detected driver steering input information; when there is no detected driver steering input information, controlling, by the controller, an Autonomous Emergency Steering Assist (AESA) device to apply a steering assist control torque value corresponding to the AESA device differently for each of collision risk levels in a collision risk situation with the detected object; and when there is the detected driver steering input information, controlling, by the controller, a Driver-initiated Emergency Steering Assist (DESA) device to apply a steering assist control torque value corresponding to the DESA device according to the driver steering input information.

When determining the collision risk situation with the detected object for each of the collision risk levels, the method may further include determining, by the controller, a risk of collision using a longitudinal collision estimated time and a lateral offset with the detected object.

When the collision risk level is a first level in which the longitudinal collision estimated time is a set first time value range and the lateral offset is a set first offset value range, the method may further include controlling, by the controller, the AESA device to apply a first steering assist control torque value of steering assist control torque values corresponding to the AESA device.

When the collision risk level is a second level in which the longitudinal collision estimated time is a second time value range shorter than a set first time value range, and the lateral offset is a second offset value range larger than a set first offset value range, the method may further include controlling, by the controller, the AESA device to apply a second steering assist control torque value higher than a first steering assist control torque value of steering assist control torque values corresponding to the AESA device.

When the collision risk level is a third level in which the longitudinal collision estimated time is a third time value range shorter than a set second time value range, and the lateral offset is a third offset value range larger than a set second offset value range, the method may further include controlling, by the controller, the AESA device to apply a third steering assist control torque value higher than a second steering assist control torque value of steering assist control torque values corresponding to the AESA device.

The method may further include, when there is the driver steering input information, controlling, by the controller, the DESA device to apply a steering assist control maximum torque value corresponding to the DESA device for each of the collision risk levels according to the driver steering input information; and controlling, by the controller, the DESA device to apply steering assist control torque values corresponding to the DESA device differently for each of the collision risk levels according to the driver steering input information.

The method may further include, when there is the driver steering input information during a first level of the collision risk levels, determining, by the controller, whether the driver steering input information is greater than a set first target steering information; and when the driver steering input information is greater than the first target steering information, controlling, by the controller, the DESA device to apply the steering assist control maximum torque value corresponding to the DESA device.

The method may further include, when there is the driver steering input information during a first level of the collision risk levels, determining, by the controller, whether the driver steering input information is greater than a second target steering information set smaller than the first target steering information; and when the driver steering input information is greater than the second target steering information, controlling, by the controller, the DESA device to apply the steering assist control maximum torque value corresponding to the DESA device.

The method may further include, when there is the driver steering input information during a first level of the collision risk levels, determining, by the controller, whether the driver steering input information is greater than a set first target steering information; and when the driver steering input information is greater than the first target steering information, controlling, by the controller, the DESA device to apply a first steering assist control torque value of the steering assist control torque values corresponding to the DESA device.

The method may further include, when there is the driver steering input information during a first level of the collision risk levels, determining, by the controller, whether the driver steering input information is greater than a second target steering information set smaller than the first target steering information; and when the driver steering input information is greater than the second target steering information, controlling, by the controller, the DESA device to apply a second steering assist control torque value higher than the first steering assist control torque value of the steering assist control torque values corresponding to the DESA device.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a block diagram illustrating a vehicle control apparatus according to exemplary embodiments of the disclosure;

FIG. 2 is a view illustrating a state in which a collision risk situation with an object is detected for each of collision risk levels in a first sensor illustrated in FIG. 1;

FIG. 3 is a view illustrating a state in which a first level of collision risk levels is determined in a controller illustrated in FIGS. 1 and 2;

FIG. 4 is a view illustrating a state in which a second level of collision risk levels is determined in a controller illustrated in FIGS. 1 and 2;

FIG. 5 is a view illustrating a state in which a third level of collision risk levels is determined in a controller illustrated in FIGS. 1 and 2;

FIG. 6 is a view illustrating a state in which a steering assist control torque value of an Autonomous Emergency Steering Assist (AESA) device and a steering assist control maximum torque value of a Driver-initiated Emergency Steering Assist (DESA) device are applied when there is driver steering input information during a first level in a controller illustrated in FIG. 1;

FIG. 7 is a view illustrating a state in which a steering assist control torque value of an AESA device and a steering assist control maximum torque value of a DESA device are applied when there is driver steering input information during a second level in a controller illustrated in FIG. 1;

FIG. 8 is a view illustrating a state in which a steering assist control torque value of an AESA device and a first steering assist control torque value of a DESA device are applied when there is driver steering input information during a first level in a controller illustrated in FIG. 1;

FIG. 9 is a view illustrating a state in which a steering assist control torque value of an AESA device and a second steering assist control torque value of a DESA device are applied when there is driver steering input information during a second level in the controller illustrated in FIG. 1;

FIG. 10 is a flowchart illustrating an example of a vehicle control method of a vehicle control apparatus according to exemplary embodiments of the disclosure;

FIG. 11 is a flowchart illustrating another example of a vehicle control method of a vehicle control apparatus according to exemplary embodiments of the disclosure;

FIG. 12 is a flowchart illustrating another example of a vehicle control method of a vehicle control apparatus according to exemplary embodiments of the disclosure; and FIG. 13 is a flowchart illustrating another example of a vehicle control method of a vehicle control apparatus according to exemplary embodiments of the disclosure.

DETAILED DESCRIPTION

Hereinafter, embodiments of the disclosure will be described in detail with reference to the accompanying drawings. The following embodiments are provided to fully convey the spirit of the disclosure to a person having ordinary skill in the art to which the disclosure belongs. The disclosure is not limited to the embodiments shown herein but may be embodied in other forms. In order to make the description of the disclosure clear, unrelated parts are not shown and, the sizes of components are exaggerated for clarity.

FIG. 1 is a block diagram illustrating a vehicle control apparatus according to exemplary embodiments of the disclosure, FIG. 2 is a view illustrating a state in which a collision risk situation with an object is detected for each of collision risk levels in a first sensor illustrated in FIG. 1, FIG. 3 is a view illustrating a state in which a first level of collision risk levels is determined in a controller illustrated in FIGS. 1 and 2, FIG. 4 is a view illustrating a state in which a second level of collision risk levels is determined in a controller illustrated in FIGS. 1 and 2, FIG. 5 is a view illustrating a state in which a third level of collision risk levels is determined in a controller illustrated in FIGS. 1 and 2, FIG. 6 is a view illustrating a state in which a steering assist control torque value of an Autonomous Emergency Steering Assist (AESA) device and a steering assist control maximum torque value of a Driver-initiated Emergency Steering Assist (DESA) device are applied when there is driver steering input information during a first level in a controller illustrated in FIG. 1, FIG. 7 is a view illustrating a state in which a steering assist control torque value of an AESA device and a steering assist control maximum torque value of a DESA device are applied when there is driver steering input information during a second level in a controller illustrated in FIG. 1, FIG. 8 is a view illustrating a state in which a steering assist control torque value of an AESA device and a first steering assist control torque value of a DESA device are applied when there is driver steering input information during a first level in a controller illustrated in FIG. 1, and FIG. 9 is a view illustrating a state in which a steering assist control torque value of an AESA device and a second steering assist control torque value of a DESA device are applied when there is driver steering input information during a second level in the controller illustrated in FIG. 1.

Referring to FIGS. 1 to 9, a vehicle control apparatus 100 may include a first sensor 101, a second sensor 102, an Autonomous Emergency Steering Assist (AESA) device 104, a Driver-initiated Emergency Steering Assist (DESA) device 106, and a controller 108.

The first sensor 101 may detect an object A, and the second sensor 102 may detect driver steering input information.

Although not illustrated, the first sensor 101 may be at least one of an image sensor and a radar sensor for detecting the object A.

In this case, the object A may be at least one of other vehicles, motorcycles, bicycles, electric bicycles, electric boards, electric kickboards, electric hoverboards, electric wheels, people, animals, and obstacles.

In addition, although not shown, the second sensor 102 may be at least one of a steering torque sensor, a steering angle sensor, and a steering wheel angular speed sensor for detecting the driver steering input information.

The AESA device 104 may perform automatic emergency steering assist, and the DESA device 106 may perform emergency steering assist based on the driver steering input information.

The controller 108 may include a processor and a memory. The memory may store a program for processing or controlling the processor and various data for operating the vehicle control apparatus 100. The processor may control the overall operation of the vehicle control apparatus 100.

The controller 108 may control the AESA device 104 to apply a steering assist control torque value corresponding to the AESA device 104 differently for each of collision risk levels in a collision risk situation with the object A detected by the first sensor 101.

Here, when the controller 108 determines the collision risk situation with the object A detected by the first sensor 101 for each of the collision risk levels, the controller 108 may determine using an estimated time to a longitudinal collision with the object A ("longitudinal collision estimated time") detected by the first sensor 101 and a lateral offset.

An example, as illustrated in FIGS. 1 to 3 and 6, when the controller 108 determines a first level T1 of the collision risk levels, the controller 108 may determine whether the longitudinal collision estimated time is a set first time value range t1 and whether the lateral offset is the set first offset value range os1.

In this case, when the controller 108 determines that the collision risk level is the first level T1, the controller 108 may control the AESA device 104 to apply a first steering assist control torque value AESAT1 among the steering assist control torque values corresponding to the AESA device 104.

As another example, as illustrated in FIGS. 1, 2, 4, and 6, when the controller 108 determines a second level T2 of collision risk levels, the controller 108 may determine whether the longitudinal collision estimated time is a second time value range t2 shorter than the first time value range t1 and whether the lateral offset is a second offset value range os2 greater than the first offset value range os1.

In this case, when the controller 108 determines that the collision risk level is the second level T2, the controller 108 may control the AESA device 104 to apply a second steering assist control torque value AESAT2 higher than the first steering assist control torque value AESAT1 among the steering assist control torque values corresponding to the AESA device 104.

As another example, as illustrated in FIGS. 1, 2, 5, and 6, when the controller 108 determines a third level T3 of collision risk levels, the controller 108 may determine whether the longitudinal collision estimated time is a third time value range t3 shorter than the second time value range t2 and whether the lateral offset is a third offset value range os3 greater than the second offset value range os2.

In this case, when the controller 108 determines that the collision risk level is the third level T3, the controller 108 may control the AESA device 104 to apply a third steering assist control torque value AESAT3 higher than the second steering assist control torque value AESAT2 among the steering assist control torque values corresponding to the AESA device 104.

When the controller 108 determines that there is driver steering input information detected by the second sensor 102, the controller 108 may control the DESA device 106 to apply a steering assist control torque value corresponding to the DESA device 106 according to the driver steering input information.

In this case, when the controller 108 determines that there is driver steering input information detected by the second sensor 102, the controller 108 may control the DESA device 106 to apply the steering assist control maximum torque value corresponding to the DESA device 106 for the collision risk levels according to the driver steering input information.

An example, as illustrated in FIGS. 1 and 6, when the controller 108 determines that a driver steering input information B is present during the first level T1 of the collision risk levels, the controller 108 may determine whether the driver steering input information B is greater than a set first target steering information.

At this time, when the controller 108 determines that the driver steering input information B is greater than the first target steering information, the controller 108 may control the DESA device 106 to apply a steering assist control maximum torque value DESAMT1 corresponding to the DESA device 106.

For example, when it is determined that the driver steering input information B is greater than 1.0 Nm, which is a first target steering torque value of the first target steering information and greater than 60 deg/s, which is a first target steering angle value, the controller 108 may control the DESA device 106 to apply the steering assist control maximum torque value DESAMT1 corresponding to the DESA device 106.

As another example, as illustrated in FIGS. 1 and 7, when the controller 108 determines that a driver steering input information B is during the second level T2 of the collision risk levels, the controller 108 may determine whether the driver steering input information B is greater than a second target steering information that is set smaller than the first target steering information.

At this time, when the controller 108 determines that the driver steering input information B is greater than the second target steering information, the controller 108 may control the DESA device 106 to apply a steering assist control maximum torque value DESAMT2 corresponding to the DESA device 106.

For example, when it is determined that the driver steering input information B is greater than 0.5 Nm, which is a second target steering torque value of the second target steering information and greater than 30 deg/s, which is a second target steering angle value, the controller 108 may control the DESA device 106 to apply the steering assist control maximum torque value DESAMT2 corresponding to the DESA device 106.

In addition, when the controller 108 determines that there is driver steering input information detected by the second sensor 102, the controller 108 may control the DESA device 106 to apply the steering assist control maximum torque value corresponding to the DESA device 106 differently for the collision risk levels according to the driver steering input information.

An example, as illustrated in FIGS. 1 and 8, when the controller 108 determines that the driver steering input information B is present during the first level T1 of the collision risk levels, the controller 108 may determine whether the driver steering input information B is greater than a set first target steering information.

At this time, when the controller 108 determines that the driver steering input information B is greater than the first target steering information, the controller 108 may control the DESA device 106 to apply the steering assist control maximum torque value DESAMT1 corresponding to the DESA device 106.

For example, when it is determined that the driver steering input information B is greater than 1.0 Nm, which is a first target steering torque value of the first target steering information and greater than 60 deg/s, which is the first target steering angle value, the controller 108 may control the DESA device 106 to apply the steering assist control maximum torque value DESAMT1 corresponding to the DESA device 106.

As another example, as illustrated in FIGS. 1 and 9, when the controller 108 determines that the driver steering input information B is during the second level T2 of the collision risk levels, the controller 108 may determine whether the driver steering input information B is greater than the second target steering information that is set smaller than the first target steering information.

At this time, when the controller 108 determines that the driver steering input information B is greater than the second target steering information, the controller 108 may control the DESA device 106 to apply the steering assist control maximum torque value DESAMT2 higher than the first steering assist control maximum torque value DESAMT1 corresponding to the DESA device 106.

For example, when it is determined that the driver steering input information B is greater than 0.5 Nm, which is the second target steering torque value of the second target steering information and greater than 30 deg/s, which is the second target steering angle value, the controller 108 may control the DESA device 106 to apply the steering assist control maximum torque value DESAMT2 higher than the first steering assist control maximum torque value DESAMT1 corresponding to the DESA device 106.

FIG. 10 is a flowchart illustrating an example of a vehicle control method of a vehicle control apparatus according to exemplary embodiments of the disclosure, FIG. 11 is a flowchart illustrating another example of a vehicle control method of a vehicle control apparatus according to exemplary embodiments of the disclosure, FIG. 12 is a flowchart illustrating another example of a vehicle control method of a vehicle control apparatus according to exemplary embodiments of the disclosure, and FIG. 13 is a flowchart illustrating another example of a vehicle control method of a vehicle control apparatus according to exemplary embodiments of the disclosure.

Referring to FIGS. 10 to 13, a vehicle control method 1000 of the vehicle control apparatus 100 may include detecting S1002, determining S1004, first control S1006, and second step S1008.

In the detecting S1002, the first sensor 101 may detect the object A, and the second sensor 102 may detect the driver steering input information.

In the first determination S1004, the controller 108 may determine whether there is no the driver steering input information detected by the second sensor 102.

In the first control S1006, when the controller 108 determines that there is no the driver steering input information detected by the second sensor 102, the controller 108 may control the AESA device 104 to apply the steering assist control torque value corresponding to the AESA device 104 differently for each of the collision risk levels in a collision risk situation with the object A detected by the first sensor 101.

In the first control S1006, when the controller 108 determines the collision risk situation with the object A detected by the first sensor 101 for each of the collision risk levels, the controller 108 may determine using the longitudinal collision estimated time with the object A detected by the first sensor 101 and the lateral offset.

An example, as illustrated in FIG. 11, in a first control S1006a, when the controller 108 determines a first level T1 of the collision risk levels, the controller 108 may determine whether the longitudinal collision estimated time is the first time value range t1 and whether the lateral offset is the first offset value range os1.

In this case, in a first control S1006b, when the controller 108 determines that the collision risk level is the first level T1, the controller 108 may control the AESA device 104 to apply the first steering assist control torque value AESAT1 among the steering assist control torque values corresponding to the AESA device 104.

As another example, in a first control S1006c, when the controller 108 determines a second level T2 of collision risk levels, the controller 108 may determine whether the longitudinal collision estimated time is the second time value range t2 shorter than the first time value range t1 and whether the lateral offset is the second offset value range os2 greater than the first offset value range os1.

In this case, in a first control S1006d, when the controller 108 determines that the collision risk level is the second level T2, the controller 108 may control the AESA device 104 to apply the second steering assist control torque value AESAT2 higher than the first steering assist control torque value AESAT1 among the steering assist control torque values corresponding to the AESA device 104.

As another example, in a first control S1006e, when the controller 108 determines the third level T3 of collision risk levels, the controller 108 may determine whether the longitudinal collision estimated time is the third time value range t3 shorter than the second time value range t2 and whether the lateral offset is the third offset value range os3 greater than the second offset value range os2.

In this case, in a first control S1006f when the controller 108 determines that the collision risk level is the third level T3, the controller 108 may control the AESA device 104 to apply the third steering assist control torque value AESAT3 higher than the second steering assist control torque value AESAT2 among the steering assist control torque values corresponding to the AESA device 104.

In the second control S1008, when the controller 108 determines that there is driver steering input information detected by the second sensor 102, the controller 108 may control the DESA device 106 to apply the steering assist control torque value corresponding to the DESA device 106 according to the driver steering input information.

In this case, in the second control S1008, when the controller 108 determines that there is driver steering input information detected by the second sensor 102, the controller 108 may control the DESA device 106 to apply the steering assist control maximum torque value corresponding to the DESA device 106 for the collision risk levels according to the driver steering input information.

An example, as illustrated in FIG. 12, in second controls S1008a and S1008b, when the controller 108 determines that a driver steering input information B is present during the first level T1 of the collision risk levels (S1008a), the controller 108 may determine whether the driver steering input information B is greater than a set first target steering information (S1008b).

At this time, in a second control S1008c, when the controller 108 determines that the driver steering input information B is greater than the first target steering information (S1008b), the controller 108 may control the DESA device 106 to apply the steering assist control maximum torque value DESAMT1 corresponding to the DESA device 106.

As another example, in second controls S1008d and S1008e, when the controller 108 determines that a driver steering input information B is during the second level T2 of the collision risk levels (S1008d), the controller 108 may determine whether the driver steering input information B is greater than a second target steering information that is set smaller than the first target steering information (S1008e).

At this time, in a second control S1008f, when the controller 108 determines that the driver steering input information B is greater than the second target steering information (S1008e), the controller 108 may control the DESA device 106 to apply a steering assist control maximum torque value DESAMT2 corresponding to the DESA device 106.

In addition, in the second control S1008, when the controller 108 determines that there is driver steering input information detected by the second sensor 102, the controller 108 may control the DESA device 106 to apply the steering assist control maximum torque value corresponding to the DESA device 106 differently for the collision risk levels according to the driver steering input information.

An example, as illustrated in FIG. 13, in second controls S1008g and S1008h, when the controller 108 determines that the driver steering input information B is present during the first level T1 of the collision risk levels (S1008g), the controller 108 may determine whether the driver steering input information B is greater than a set first target steering information (S1008h).

At this time, in a second control S1008i, when the controller 108 determines that the driver steering input information B is greater than the first target steering information, the controller 108 may control the DESA device 106 to apply the steering assist control maximum torque value DESAMT1 corresponding to the DESA device 106.

As another example, in second controls S1008j and S1008k, when the controller 108 determines that the driver steering input information B is during the second level T2 of the collision risk levels (S1008j), the controller 108 may determine whether the driver steering input information B is greater than the second target steering information that is set smaller than the first target steering information (S1008k).

At this time, in a second control 510081, when the controller 108 determines that the driver steering input information B is greater than the second target steering information, the controller 108 may control the DESA device 106 to apply the steering assist control maximum torque value DESAMT2 higher than the first steering assist control maximum torque value DESAMT1 corresponding to the DESA device 106.

As described above, the disclosure may control the AESA device 104 to apply the steering assist control torque value corresponding to the AESA device 104 differently for collision risk levels according to the collision risk situation with the object A. When there is driver steering input information, the DESA device 106 may be controlled to apply the steering assist control torque value corresponding to the DESA device 106 according to the driver steering input information.

Therefore, the disclosure may further prevent the collision with the object A and further maintain a stable riding comfort during avoidance control.

As is apparent from the above, the vehicle control apparatus and the control method can further prevent the collision with the object.

In addition, the vehicle control apparatus and the control method can further maintain a stable riding comfort in avoidance control.

What is claimed is:

1. A vehicle control apparatus comprising:
    a first sensor configured to detect an object;
    a second sensor configured to detect driver steering input information;
    an Autonomous Emergency Steering Assist (AESA) device configured to perform automatic emergency steering assistance;
    a Driver-initiated Emergency Steering Assist (DESA) device configured to perform emergency steering assistance based on a detected driver steering input information; and
    a controller configured to:
        control the AESA device to apply a steering assist control torque value differently for each of collision risk levels in a collision risk situation with a detected object; and
        if driver steering input information is detected, control the DESA device to apply a steering assist control torque value according to the driver steering input information,
    wherein, when determining the collision risk situation with a detected object for each of the collision risk levels, the controller is configured to determine a risk of collision using a longitudinal collision estimated time and a lateral offset with respect to the detected object.

2. The vehicle control apparatus according to claim 1, wherein, when the collision risk level is a first level in which the longitudinal collision estimated time is a set first time value range and the lateral offset is a set first offset value range, the controller is configured to control the AESA device to apply a first steering assist control torque value.

3. The vehicle control apparatus according to claim 1, wherein, when the collision risk level is a second level in which the longitudinal collision estimated time is a second time value range shorter than a set first time value range, and the lateral offset is a second offset value range larger than a set first offset value range, the controller is configured to control the AESA device to apply a second steering assist control torque value higher than a first steering assist control torque value.

4. The vehicle control apparatus according to claim 1, wherein, when the collision risk level is a third level in which the longitudinal collision estimated time is a third time value range shorter than a set second time value range, and the lateral offset is a third offset value range larger than a set second offset value range, the controller is configured to control the AESA device to apply a third steering assist control torque value higher than a second steering assist control torque value.

5. The vehicle control apparatus according to claim 1, wherein, when the driver steering input information is detected, the controller is configured to:
    control the DESA device to apply a steering assist control maximum torque value for each of the collision risk levels according to the driver steering input information.

6. The vehicle control apparatus according to claim 5, wherein the maximum steering assist control torque value depends on the collision risk level.

7. The vehicle control apparatus according to claim 5, wherein the controller is configured to:
    determine, if the driver steering input information is detected during a first level of the collision risk levels, whether the driver steering input information is greater than a set first target steering information; and
    control, when the driver steering input information is greater than the first target steering information, the DESA device to apply the steering assist control maximum torque value.

8. The vehicle control apparatus according to claim 5, wherein the controller is configured to:
    determine, if the driver steering input information is detected during a first level of the collision risk levels, whether the driver steering input information is greater than a second target steering information set smaller than the first target steering information; and
    control, when the driver steering input information is greater than the second target steering information, the DESA device to apply the steering assist control maximum torque value.

9. The vehicle control apparatus according to claim 5, wherein the controller is configured to:
    determine, if the driver steering input information is detected during a first level of the collision risk levels, whether the driver steering input information is greater than a set first target steering information; and
    control, when the driver steering input information is greater than the first target steering information, the DESA device to apply a first steering assist control torque value of the steering assist control torque values.

10. The vehicle control apparatus according to claim 5, wherein the controller is configured to:
    determine, if the driver steering input information is detected during a first level of the collision risk levels, whether the driver steering input information is greater than a second target steering information set smaller than the first target steering information; and
    control, when the driver steering input information is greater than the second target steering information, the DESA device to apply a second steering assist control torque value higher than the first steering assist control torque value of the steering assist control torque values.

11. A method of providing emergency steering input to a vehicle, the method comprising:
   detecting, by a sensor, an object and whether a steering input is provided by a driver of the vehicle;
   causing, by a controller, upon detection that a steering input not provided by the driver, an Autonomous Emergency Steering Assistance (AESA) device to apply a steering control torque of a value based on a determined collision risk level; and
   causing, by the controller, upon detection that a steering input is provided by the driver, a Driver-initiated Emergency Steering Assistance (DESA) device to apply a steering control of a value based on a determined steering input provided by the driver,
   causing, by the controller, if the driver steering input information is detected, the DESA device to apply a steering assist control maximum torque value for each of the collision risk levels according to the driver steering input information.

12. The method according to claim 11, further comprising:
   determining the collision risk level based on an estimated time-to-collision (TTC) with the detected object and a lateral offset of the vehicle relative to the detected object.

13. The method according to claim 12, further comprising:
   if the collision risk level is a first level in which the estimated TTC is in a first time value range and the lateral offset is in a first offset value range, causing, by the controller, the AESA device to apply a first steering assist control torque value.

14. The method according to claim 12, further comprising:
   if the collision risk level is a second level in which the estimated TTC is in a second time value range shorter than a first time value range, and the lateral offset is in a second offset value range larger than a first offset value range, causing, by the controller, the AESA device to apply a second steering assist control torque value higher than a first steering assist control torque value.

15. The method according to claim 12, further comprising:
   if the collision risk level is a third level in which the estimated TTC is in a third time value range shorter than a second time value range, and the lateral offset is in a third offset value range larger than a second offset value range, causing, by the controller, the AESA device to apply a third steering assist control torque value higher than a second steering assist control torque value.

16. The method of claim 12, further comprising causing the AESA device to:
   apply the steering control torque at a first torque value if the determined collision risk level is a first level wherein the TTC is in a first time range and the lateral offset is in a first offset range, and
   apply the steering control torque at a second torque value greater than the first torque value if the determined collision risk level is a second level wherein the TTC is in a second time range smaller than the first time range and the lateral offset is in a second offset range greater than the first offset range.

17. The method according to claim 11, wherein the maximum steering assist control torque value depends on the collision risk level.

18. The method according to claim 11, further comprising:
   if the driver steering input information is detected during a first level of the collision risk levels, determining, by the controller, whether a driver steering input torque is greater than a first target steering torque; and
   if the driver steering input torque is greater than the first target steering torque, causing, by the controller, the DESA device to apply the steering assist control maximum torque value.

19. The method according to claim 11, further comprising:
   if the driver steering input information is detected during a first level of the collision risk levels, determining, by the controller, whether a driver steering input torque is greater than a second target steering torque smaller than a first target steering torque; and
   if the driver steering input torque is greater than the second target steering torque, causing, by the controller, the DESA device to apply the steering assist control maximum torque value.

20. The method according to claim 11, further comprising:
   if the driver steering input information is detected during a first level of the collision risk levels, determining, by the controller, whether a driver steering input torque is greater than a first target steering torque; and
   if the driver steering input information is greater than the first target steering information, causing, by the controller, the DESA device to apply a first steering assist control torque value.

21. The method according to claim 11, further comprising:
   if the driver steering input information is detected during a first level of the collision risk levels, determining, by the controller, whether a driver steering input torque is greater than a second target steering torque smaller than a first target steering torque; and
   if the driver steering input information is greater than the second target steering torque, causing, by the controller, the DESA device to apply a second steering assist control torque value higher than a first steering assist control torque value.

22. A non-transitory computer-readable medium storing computer-executable instructions when executed by a processor causes the processor to perform the method of claim 11.

23. An advanced driver assistance system (ADAS), comprising:
   a first sensor configured to detect an object in front of a vehicle;
   a second sensor configured to detect whether a steering input is provided by a driver of the vehicle;
   an Autonomous Emergency Steering Assist (AESA) device configured to provide automatic emergency steering assistance;
   a Driver-initiated Emergency Steering Assist (AESA) device configured to provide driver-initiated emergency steering assistance based on a detected steering input provided by the driver; and
   a controller comprising a processor and a memory, the processor being configured to:
      determine a collision risk level if an impending collision with a detected object is anticipated,
      cause the AESA device to apply a steering control torque of a value based on a determined collision risk level, and cause, if a steering input provided by the driver is detected, the DESA device to apply a steering control torque at a value based on the detected steering input provided by the driver, wherein the collision risk level is determined based on an estimated time-to-collision (TTC) with the detected object and a lateral offset of the vehicle relative to the detected object.

24. The ADAS of claim 23, wherein the controller is configured to cause the AESA device to:

apply the steering control torque at a first torque value if the determined collision risk level is a first level wherein the TTC is in a first time range and the lateral offset is in a first offset range, and apply the steering control torque at a second torque value greater than the first torque value if the determined collision risk level is a second level wherein the TTC is in a second time range smaller than the first time range and the lateral offset is in a second offset range greater than the first offset range.

25. The ADAS of claim 23, the controller is configure to cause the DESA device to:

apply a steering control torque at a maximum value irrespective of the determined collision risk level if a steering input provided by the driver is detected.

26. The ADAS of claim 23, wherein the controller is configured to:

determine, if a steering input provided by the driver is detected during a first collision risk level, whether the steering input provided by the driver is greater than a first threshold torque value, and cause, if the steering input provided by the driver is determined to be greater than the first threshold torque value, the DESA device to apply a steering control torque at a maximum value.

27. The ADAS of claim 23, wherein the controller is configured to:

determine, if a steering input provided by the driver is detected during a first collision risk level, whether the steering input provided by the driver is greater than a second threshold torque value smaller than a first threshold torque value, and cause, if the steering input provided by the driver is determined to be greater than the second threshold torque value, the DESA device to apply a steering control torque at a maximum value.

* * * * *